(12) United States Patent
Gutta et al.

(10) Patent No.: US 6,778,705 B2
(45) Date of Patent: Aug. 17, 2004

(54) CLASSIFICATION OF OBJECTS THROUGH MODEL ENSEMBLES

(75) Inventors: Srinivas Gutta, Buchanan, NY (US); Vasanth Philomin, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 649 days.

(21) Appl. No.: 09/794,443

(22) Filed: Feb. 27, 2001

(65) Prior Publication Data

US 2002/0181785 A1 Dec. 5, 2002

(51) Int. Cl.$^7$ ............................................... G06K 9/62
(52) U.S. Cl. ...................... 382/224; 382/190; 382/227
(58) Field of Search ............................. 382/103, 159, 382/173, 224, 236, 190, 261–264; 707/1, 7

(56) References Cited

U.S. PATENT DOCUMENTS

| | | | | |
|---|---|---|---|---|
| 5,699,119 A | * | 12/1997 | Chung et al. | 375/240.04 |
| 5,854,856 A | * | 12/1998 | Moura et al. | 382/232 |
| 5,862,508 A | * | 1/1999 | Nagaya et al. | 701/207 |
| 6,263,088 B1 | * | 7/2001 | Crabtree et al. | 382/103 |
| 6,606,412 B1 | * | 8/2003 | Echigo et al. | 382/224 |
| 6,678,413 B1 | * | 1/2004 | Liang et al. | 382/181 |

FOREIGN PATENT DOCUMENTS

| | | | | |
|---|---|---|---|---|
| GB | 2266638 | * | 3/1993 | H04N/5/14 |

OTHER PUBLICATIONS

Lim, et al. (Moving Object Classification in a Domestic Environment using Quadratic Neural Networks, IEEE, pp. 375–383, 1994.*

Donohoe "Combining segmentation and tracking for the classification of moving objects in video scenes", IEEE, pp. 533–537, 1988.*

Lipton, et al. "Moving target classification and tracking from real-time video", IEEE, pp. 8–14, 1998.*

Dobnikar "Tracking and classifying 3D objects from TV pictures a neural network approach", IEEE, pp. 313–324, 1991.*

Gutta, "Face Recognition Using Hybrid Classifiers", Pattern Recognition, Pergamon Press Inc., vol. 30, No. 4, Apr. 1997, pp. 539–553.

Le Roux, "An Overview of Moving Object Segmentation in Video Images", Communications and Signal Processing, IEEE, Aug. 1991, pp. 53–57.

Elgammal A., et al., "Non–parametric Model for Background Subtraction", European Conference on Computer Vision (ECCV) 2000, Dublin Ireland, Jun. 2000.

Battiti R., et al., "Democracy in Neural Nets: Voting Schems for Classification", Neural Network, vol. 7, No. 44, pp. 691–707, 1994.

Raja Y., et al., "Segmentation and Tracking Using Color Mixture Models", Proceedings of the $3^{rd}$ Asian Conference on Computer Vision, vol. I, pp. 607–614, Hong Kong, China, 1/98.

Kittler J., et al., "Combining Classifiers", Proceedings of ICPR, vo. II, Track B Pattern Recognition and Signal Analysis, pp. 897–901, Aug. 25–29, 1996.

* cited by examiner

*Primary Examiner*—Daniel Mariam
(74) *Attorney, Agent, or Firm*—Gregory L. Thorne (57) ABSTRACT

A method for classification of objects in video image data. The method including the steps of: detecting moving objects in the image data; extracting two or more features from each detected moving object in the image data; classifying each moving object for each of the two or more features according to a classification method; and deriving a classification for each moving object based on the classification method for each of the two or more features. Also provided is an apparatus for classification of objects in video image data.

16 Claims, 4 Drawing Sheets

CLASSIFICATION OF OBJECTS THROUGH MODEL ENSEMBLES

BACKGROUND OF THE INVENTION

1. Field of the Invention

The present invention relates generally to object classification, and more particularly, to classification of objects in image data based on individual opinions from a number of classifiers (models) to derive a consensus opinion.

2. Prior Art

The ultimate goal in the design of any pattern recognition system is to achieve the best possible classification (predictive) performance. This objective traditionally led to the development of different classification schemes for the particular pattern recognition problem to be solved. The results of an experimental assessment of the different designs would then be the basis for choosing one of the classifiers (model selection) as a final solution to the problem. It has been observed in such design studies, that although one of the designs would yield the best performance, the sets of patterns misclassified by the different classifiers would not necessarily overlap.

In view of the prior art, there is a need for a method for the classification of objects in image data, which makes use of this observation to achieve the best possible classification performance.

SUMMARY OF THE INVENTION

Therefore it is an object of the present invention to provide a method for the classification of objects in image data which derives a consensus opinion regarding object classification from individual opinions from a number of classifiers (models).

Accordingly, a method for classification of objects in video image data is provided. The method comprises the steps of: detecting moving objects in the image data; extracting two or more features from each detected moving object in the image data; classifying each moving object for each of the two or more features according to a classification method; and deriving a classification for each moving object based on the classification method for each of the two or more features.

Preferably, the method further comprises the step of filtering out unintended moving objects from the detected moving objects, wherein the filtering step filters out the unintended moving objects according to a detected speed and aspect ratio of each detected moving object.

More preferably, the extracting step comprises extracting at least two of x-gradient, y-gradient, and combined xy-gradient features from each of the detected moving objects, and further comprises the steps of smoothing the image data to reduce the effects of noise and then applying a derivative operator over the image data prior to the extracting step.

The classifying step comprises either using the same classification method for each of the two or more features or using at least two different classification methods for at least two of the two or more features.

Preferably, the classification method comprises a Radial Basis Function Network for training and classifying at least one of the detected moving objects and the classifying step comprises outputting a class label identifying a class to which the detected moving object corresponds to and a probability value indicating the probability with which the unknown pattern belongs to the class for each of the two or more features.

Also provided is an apparatus for classification of objects in video image data. The apparatus comprises: means for detecting moving objects in the image data; means for extracting two or more features from each detected moving object in the image data; means for classifying each moving object for each of the two or more features according to a classification method; and means for deriving a classification for each moving object based on the classification method for each of the two or more features.

Still yet provided are a program storage device readable by machine, tangibly embodying a program of instructions executable by the machine to perform the method steps of the present invention and a computer program product embodied in a computer-readable medium for classification of objects in video image data which comprises computer readable program code means for carrying out the method steps of the present invention.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of classification models, it has been found particularly useful in the environment of Radial Basis Function (RBF) classifiers. Therefore, without limiting the applicability of the invention to RBF classifiers, the invention will be described in such environment. It will be appreciated by those in the art that any probabilistic/stochastic methods for classification can be used in the disclosed methods without departing from the scope or spirit of the present invention. Furthermore, the features used in the RBF models described herein are gradients of the image data, which are described by way of example only and not to limit the scope of the invention. Those skilled in the art will appreciate that other features may also be used in addition to other types of gradients.

The classification methods of the present invention do not rely on a single decision making scheme. Instead, all the classifiers (alternatively referred to as experts since that classifier displays an expert-like performance as it might be best suited for a particular task), or their subset, are used for decision making by combining their individual opinions to derive a consensus decision. In other words, classifiers with different methodologies or different features have been found to be complementary to each other; hence, the combination of different classifiers will reduce errors drastically and achieve a higher performance.

Figure 1:
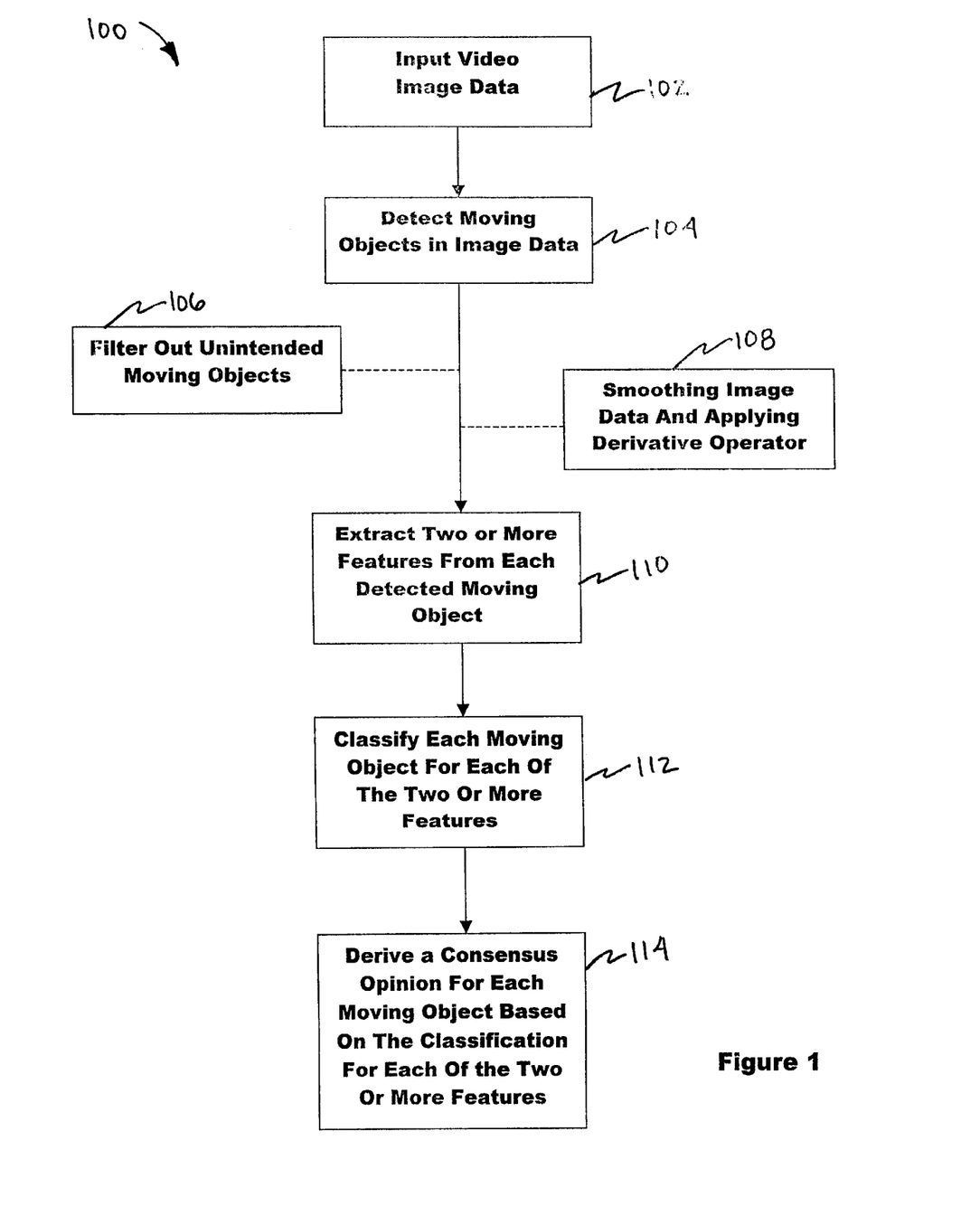
FIG. 1 illustrates a flowchart showing the steps of the classification methods of the present invention.

The classification methods of the present invention will now be described with regard to the flowchart of FIG. 1, the classification method being referred to by reference numeral 100. At step 102, video image data is input into the classification method 100. At step 104, the video image data is analyzed to detect any moving objects therein. Any known methods for detecting moving objects in video image data can be utilized in the classification methods 100 of the present invention. Preferably, the moving objects are detected in the video image data by utilizing a background subtraction scheme, such as that disclosed by Elgammal et al., "Non-parametric Model for Background Subtraction" European Conference on Computer Vision (ECCV) 2000, Dublin, Ireland, June 2000. However, background subtraction is given by way of example only and not to limit the scope or spirit of the invention. Those skilled in the art will appreciate that any other methods, now known or later developed for detecting moving objects in video image data can also be utilized in the methods of the present invention, such as methods that use color information as a way to segment objects. A example of such a method is disclosed in Raja et al., "Segmentation and Tracking Using Colour Mixture Models", in the Proceedings of the 3rd Asian Conference on Computer Vision, Vol. I, pp. 607–614, Hong Kong, China, January 1998.

Preferably, at step 106, unintended moving objects are filtered out from the detected moving objects. For example, if the purpose of the classification method is to classify moving objects as either people or animals, classification of other moving objects in the video image data, such as chairs is unnecessary and may even corrupt the classification analysis. Therefore, it is preferable to filter out such unintended moving objects by looking at the speed and aspect ratio of the detected moving objects.

Figure 2:
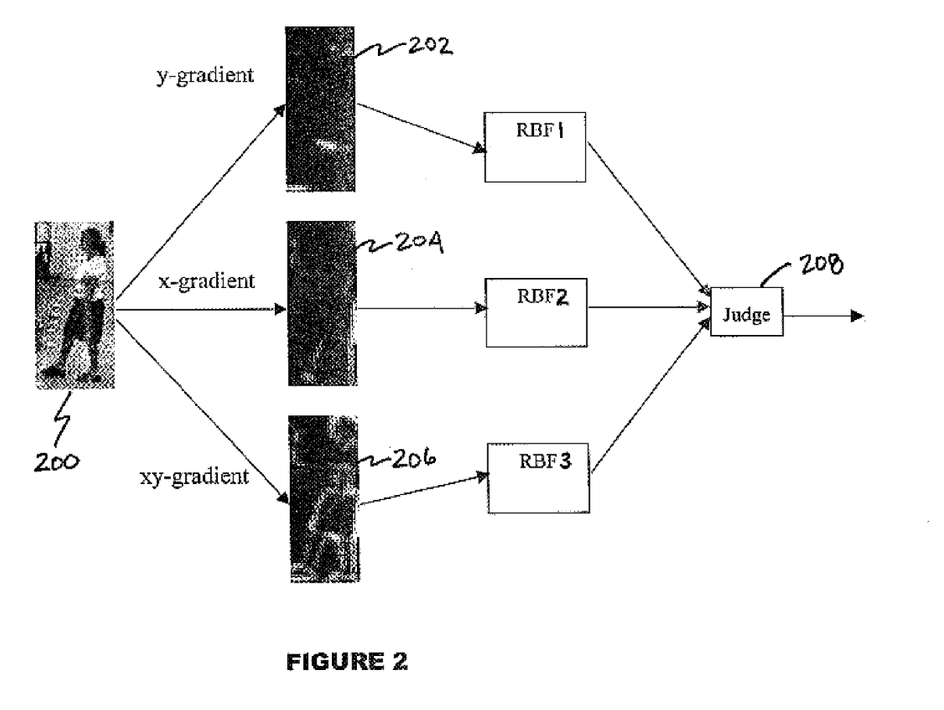
FIG. 2 illustrates a detected moving object in video image data and the classification thereof by the classification methods of FIG. 1.

At step 110, two or more features are extracted from each detected moving object in the video image data. Such features may include, at least two of x-gradient, y-gradient, and combined xy-gradient features for each of the detected moving objects. Preferably all three of the x-gradient, y-gradient, and combined xy-gradient features are extracted from each of the detected moving objects. FIG. 2 illustrates an input image 200 of a detected moving object, a walking female, in the video image data. FIGS. 202, 204, 206 illustrate the y-gradient, x-gradient, and combined x-y-gradient for the input image 200, respectively. The gradient is a measure of change in a function and the image can be considered to be an array of samples of some continuous function of image intensity.

Since a classification method should be able to classify objects under various poses and illumination conditions, it would be non-trivial if not impossible to model the entire space that the instances of a certain object class occupy given the fact that instances of the same class may look very different from each other (e.g. people wearing different clothes). Instead, what is preferable is to identify and model features that do not change much under these different scenarios. The gradient is one such feature since it reduces the dimension of the object space drastically by only capturing the shape information.

Those skilled in the art will appreciate that although the x-gradient, y-gradient, and combined x-y-gradient features are preferred, other features of image data, now known or later developed can be utilized in the classification methods 100 of the present invention, such as the type of motion exhibited by the objects. For instance, the type of motion exhibited by animals (e.g., a dog or cat) is different from those exhibited by humans. Still yet another feature that can be used to classify between humans and animals include appearance based features, such as looking for face-like region or skin detection.

Referring back to FIG. 1, alternatively, at step 108 input image data is first smoothed to reduce the effects of noise, after which a derivative operator (horizontal/vertical/combined) is applied over the entire image. Preferably, a Sobel operator is used which performs both of the operations of step 108 simultaneously.

At step 112, a particular classification method is applied to each of the extracted features for each moving object detected. As discussed above, the same or a different classification method can be used for each of the extracted features from each detected moving object. Preferably, the classification method comprises a Radial Basis Function (RBF) for training and classifying at least one of the detected moving objects. More preferably, each of the x-gradient, y-gradient, and x-y-gradient images are used by the RBF classifier for classification.

The RBF classifier will now be described with reference to FIG. 3. The construction of the RBF network involves three different layers, an input layer 300, a second layer 310, and an output layer 320. The input layer 310 is made up of source nodes (sensory units) (k). The second layer 310 is a hidden layer whose goal is to cluster the data and reduce its dimensionality. The output layer 320 supplies the response of the RBF network to the feature patterns applied to the input layer 300. The transformation from the input space 300 to the hidden-unit space 310 is non-linear, whereas the transformation from the hidden-unit space 310 to the output space 320 is linear.

In particular, a RBF classifier can be viewed in two ways. One is to interpret the RBF classifier as a set of kernel functions that expand input vectors into a high-dimensional space, trying to take advantage of the mathematical fact that a classification problem cast into a high-dimensional space is more likely to be linearly separable than one in a low-dimensional space. Another view is to interpret the RBF classifier as a function-mapping interpolation method that tries to construct hypersurfaces, one for each class, by taking a linear combination of the Basis Functions (BF). These hypersurfaces can be viewed as discriminant functions, where the surface has a high value for the class it represents and a low value for all others. An unknown input vector is classified as belonging to the class associated with the hypersurface with the largest output at that point. In this case the BFs do not serve as a basis for a high-dimensional space, but as components in a finite expansion of the desired hypersurface where the component coefficients, (the weights) have to be trained.

Figure 3:
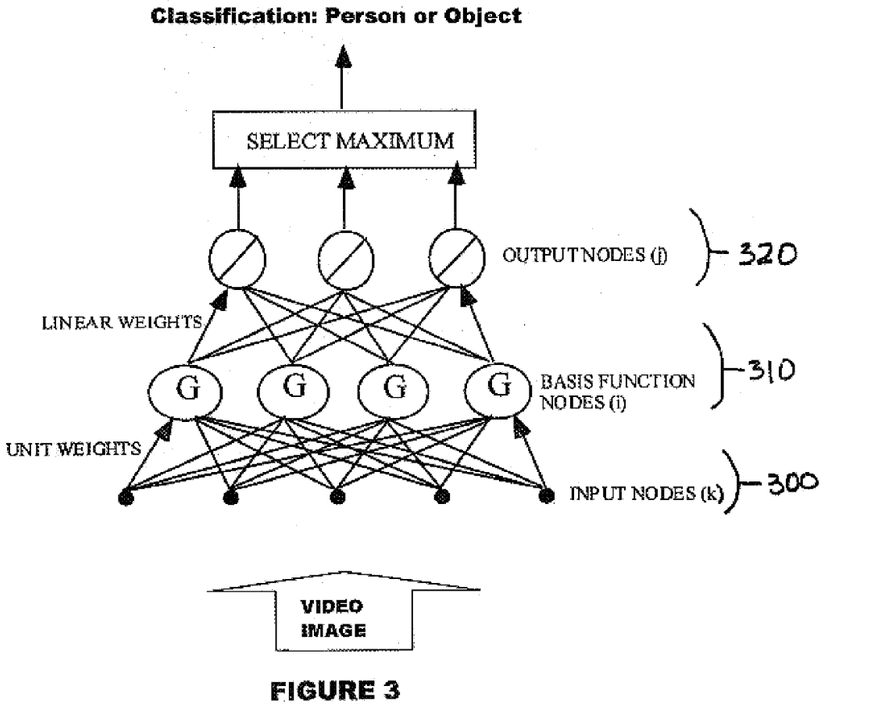
FIG. 3 illustrates Radial Basis Function Network used in the classification methods of FIG. 1.

An RBF classifier has an architecture very similar to that of a traditional three-layer back-propagation network shown in FIG. 3. Connections between the input 300 and middle layers 310 have unit weights and, as a result, do not have to be trained. Nodes in the middle layer 310, called BF nodes (i), have a Gaussian pulse nonlinearity specified by a particular mean vector $\mu_i$ and variance vector $\sigma_i^2$, where i=1, ..., F and F is the number of BF nodes (i). Note that $\sigma_i^2$ represents the diagonal entries of the covariance matrix of Gaussian pulse (i). Given a D-dimensional input vector X, each BF node (i) outputs a scalar value $y_i$ reflecting the activation of the BF caused by that input:

$$y_i = \phi_i(\|X - \mu_i\|) = \exp\left[-\sum_{k=1}^{D} \frac{(x_k - \mu_{ik})^2}{2h\sigma_{ik}^2}\right], \quad (1)$$

Where h is a proportionality constant for the variance, $X_k$ is the $k^{th}$ component of the input vector $X=[x_1, x_2, \ldots, X_D]$, and $\mu_{ik}$ and $\sigma_{ik}^2$ are the $k^{th}$ components of the mean and variance vectors, respectively, of basis node (i). Inputs that are close to the center of the Gaussian BF result in higher activations, while those that are far away result in lower activations. Since each output node (j) of the RBF network forms a linear combination of the BF node activations, the network connecting the middle and output layers is linear:

$$z_j = \sum_i w_{ij} y_i + w_{oj} \qquad (2)$$

where $z_j$ is the output of the $j^{th}$ output node, $y_i$ is the activation of the $i^{th}$ BF node, $w_{ij}$ is the weight connecting the $i^{th}$ BF node to the $j^{th}$ output node, and $w^{oj}$ is the bias or threshold of the $j^{th}$ output node. This bias comes from the weights associated with a BF node that has a constant unit output regardless of the input.

An unknown vector X is classified as belonging to the class associated with the output node j with the largest output $z_j$. The weights $w_{ij}$ in the linear network are not solved using iterative minimization methods such as gradient descent. They are determined quickly and exactly using a matrix pseudoinverse technique.

A detailed algorithmic description of the preferably RBF classifier used is shown below in Tables 1 and 2. Initially the size of the RBF network is determined by selecting F, the number of BFs. The appropriate value of F is problem-specific and usually depends on the dimensionality of the problem and the complexity of the decision regions to be formed. In general, F can be determined empirically by trying a variety of Fs, or it can be set to some constant number, usually larger than the input dimension of the problem.

After F is set, the mean $\mu_I$ and variance $\sigma_I^2$ vectors of the BFs can be determined using a variety of methods. They can be trained along with the output weights using a back-propagation gradient descent technique, however, this usually requires a long training time and may lead to suboptimal local minima. Alternatively, the means and variances can be determined before training the output weights. Training of the networks would then involve only determining the weights.

The BF centers and variances are normally chosen so as to cover the space of interest. Different techniques can be used; a grid of equally spaced BFs that sample the input space; a clustering algorithm such as K-means to determine the set of BF centers, or random vectors from the training set as BF centers, making sure that each class is represented.

Once the BF centers or means are determined, the BF variances or widths $\sigma_I^2$ can be set. They can be fixed to some global value or set to reflect the density of the data vectors in the vicinity of the BF center. In addition, a global proportionality factor H for the variances is included to allow for rescaling of the BF widths. By searching the space of H for values that result in good performance, its proper value is determined.

After the BF parameters are set, the next step is to train the output weights. Individual training patterns X(p) and their class labels C(p) are presented to the classifier, and the resulting BF node outputs $Y_I(p)$, are computed. These and desired outputs $d_j(p)$ are then used to determine the F×F correlation matrix R and the F×M output matrix B. Note that each training pattern produces one R and B matrices. The final R and B matrices are the result of the sum of N individual R and B matrices, where N is the total number of training patterns. Once all N patterns have been presented to the classifier, the output weights $w_{ij}$ can be determined. The final correlation matrix R is inverted and is used to determine each $w_{ij}$.

TABLE 1

1. Initialize (a) Fix the network structure by selecting F, the number of basis functions, where each basis function I has the output where k is the component index.

$$y_i = \phi_i(\|X - \mu_i\|) = \exp\left[-\sum_{k=1}^{D} \frac{(x_k - \mu_{ik})^2}{2h\sigma_{ik}^2}\right],$$

(b) Determine the basis function means $\mu_I$, where I = 1, ..., F, using K-means clustering algorithm.
(c) Determine the basis function variances $\sigma_I^2$, where I = 1, ..., F.
(d) Determine H, a global proportionality factor for the basis function variances by empirical search 2. Present Training (a) Input training patterns X(p) and their class labels C(p) to the classifier, where the pattern index is p = 1, ..., N.
(b) Compute the output of the basis function nodes $y_I(p)$, where I = I, ..., F, resulting from pattern X(p).

$$R_{il} = \sum_p y_i(p) y_l(p)$$

(c) Compute the F × F correlation matrix R of the basis function outputs:
(d) Compute the F × M output matrix B, where $d_j$ is the desired output and M is the number of output classes:

$$B_{lj} = \sum_p y_l(p) d_j(p), \text{ where } d_j(p) = \begin{cases} 1 & \text{if } C(p) = j \\ 0 & \text{otherwise,} \end{cases}$$

and j = 1, ..., M.

3. Determine Weights (a) Invert the F × F correlation matrix R to get $R^{-1}$.
(b) Solve for the weights in the network using the following equation:

$$w_{ij}^* = \sum_l (R^{-1})_{il} B_{lj}$$

Classification is performed by presenting an unknown input vector $X_{test}$ to the trained classifier and computing the resulting BF node outputs $y_i$. These values are then used, along with the weights $w_{ij}$, to compute the output values $z_j$. $X_{test}$ is then classified as belonging to the class associated with the output node j with the largest $z_j$ output.

TABLE 2

1. Present input pattern $X_{test}$ to the classifier
2. Classify $X_{test}$
    (a) Compute the basis function outputs, $$y_i = \phi(\|X_{test} - \mu_i\|)$$

for all F basis functions
    (b) Compute output node activations:

$$z_j = \sum_i w_{ij} y_i + w_{oj}$$

(c) Select the output $z_j$ with the largest value and classify $X_{test}$ as the class j.

In the method of the present invention, the RBF input 300 consists of n size normalized gradient images (the detected moving objects in the video image data) fed to the network as one-dimensional vectors. The hidden (unsupervised) layer 310, implements an enhanced k-means clustering procedure, where both the number of Gaussian cluster nodes and their variances are dynamically set. The number of clusters varies, in steps of 5, from ⅕ of the number of training images to n, the total number of training images. The width of the Gaussian for each cluster, is set to the maximum {the distance between the center of the cluster and the farthest away member—within class diameter, the distance between the center of the cluster and closest pattern from all other clusters} multiplied by an overlap factor o, here equal to 2. The width is further dynamically refined using different proportionality constants h. The hidden layer 310 yields the equivalent of a functional shape base, where each cluster node encodes some common characteristics across the shape space. The output (supervised) layer maps shape encodings ('expansions') along such a space to their corresponding ID classes and finds the corresponding expansion ('weight') coefficients using pseudoinverse techniques. Note that the number of clusters is frozen for that configuration (number of clusters and specific proportionality constant h) which yields 100% accuracy on ID classification when tested on the same training images.

Lastly, at step 114, a classification is derived for each moving object based on the classification method for each of the features. For a connectionist architecture to be successful it has to cope with the variability available in the image acquisition process. Preferably, the solution to the above problem is to implement the equivalent of query by consensus using ensembles of radial basis functions (ERBF), where each RBF network acts as an individual jury member and then collectively reach some decision. Network ensembles could be defined in terms of their specific topology (connections and RBF nodes) or the data they are trained on. As an example, FIG. 2 illustrates an ensemble which contains multiple classifiers, RBF1, RBF2, and RBF3 trained on different gradient images, namely, the x-gradient 202, y-gradient 204, and combined x-y-gradient 206 from which a consensus opinion 208 is formed.

When an unknown image 200 is passed to each classifier RBF1, RBF2, and RBF3, it preferably outputs two values, one value corresponds to the class label (a class to which that image 200 corresponds to, e.g., person, animal, or object) and the other value is the probability value which indicates the probability with which the unknown image 200 belongs to the indicated class.

As shown in FIG. 2, in a preferred implementation of the classification method 100 of the present invention, three classifiers, each trained on x-gradients, y-gradients and xy-gradients are used. Thus, each of the three classifiers, RBF1, RBF2, and RBF3 would give three class labels and three probability values when an unknown image 200 is passed to them.

Although there are many ways to determine a final classification for the unknown image 200 from the class labels and probability values for each of the extracted features, the following two ways are preferred for their simplicity:

(1) an average of all the probability values is taken. If the average is greater than some threshold value, then it is determined that the image 200 belongs to the indicated class; or (2) a voting scheme is utilized wherein if a majority of the classifiers agree on a particular class for the unknown image 200 under consideration then it is determined that the unknown image 200 belongs to that class. For instance, if RBF1 indicates that image 200 belongs to class 1, RBF2 indicates that the image 200 belongs to class 2, while RBF3 indicates that the image 200 belongs to class 1, class 1 is assigned to the image 200 since two of the three classifiers agree.

Figure 4:
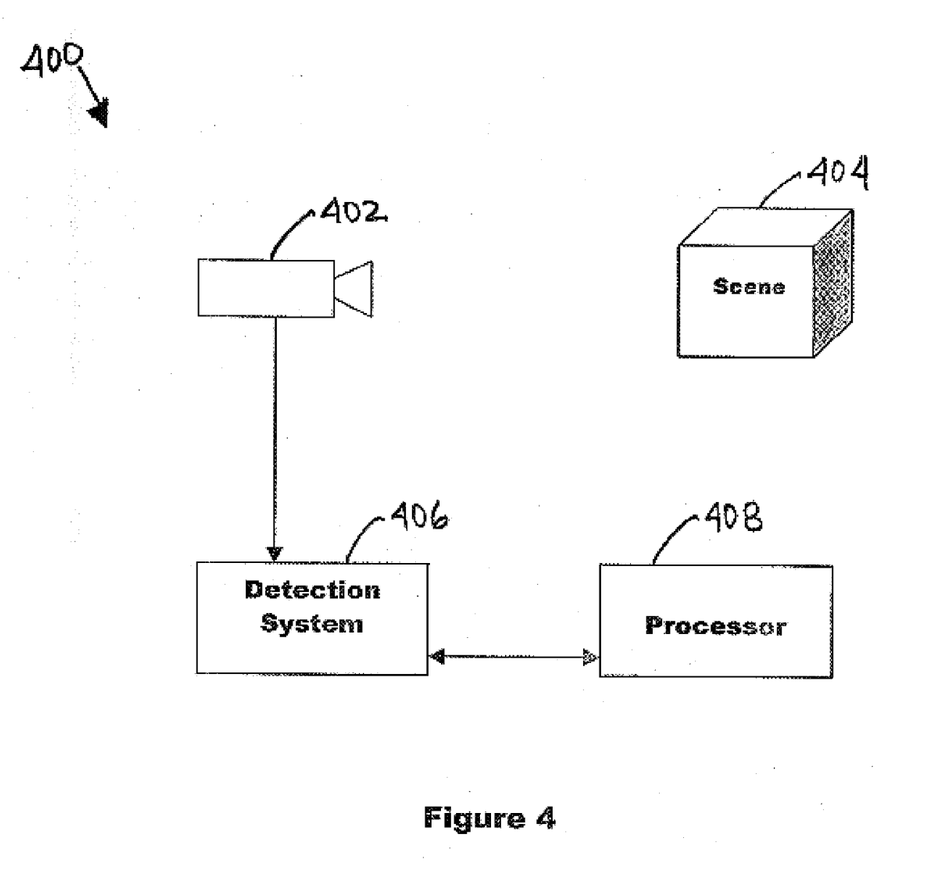
FIG. 4 illustrates a schematical view of an apparatus for carrying out the classification methods of FIG. 1.

Referring now to FIG. 4, there is illustrated a schematical representation of an apparatus for carrying out the classification methods 100 of the present invention. The apparatus being generally referred to by reference numeral 400. Apparatus 400 includes at least one video camera 402 for capturing video image data of a scene 404 to be classified. The video camera 402 preferably captures digital image data of the scene 404 or alternatively, the apparatus further includes a analog to digital converter (not shown) to convert the video image data to a digital format. The digital video image data is input into a detection system 406 for detection of moving objects therein. Any moving objects detected by the detection system 406 is preferably input into a processor 408, such as a personal computer, for analyzing the moving object image data (i.e., extracting two or more features from each detected moving object in the image data) and performing the classification analysis for each of the extracted features as well as deriving the consensus opinion for each of the detected moving objects.

Those skilled in the art will appreciate that the object classification methods of the present invention have particular utility in the area of security systems, preferably home security systems. Security systems of the prior art use electromechanical sensors to trigger alarms. The problem with such systems is that, a number of false alarms are generated. Whenever an alarm gets generated, a signal is typically is sent to the central monitoring center. The central monitoring center then calls the house or the contact number to confirm whether the alarm is a false alarm. If such a confirmation cannot be made, the central monitoring center typically contacts the police to investigate the alarm. Often a significant number of alarms are false alarms. Statistics show that around 90% of alarms generated are false alarms. To counter this problem, newer systems are installing cameras in the house to reduce the false alarms. In these systems, an operator at the central monitoring center gets a visual image but still additional work is involved in the sense that sometimes the object is not clear. An alternative way to ease the load on the operator is to classify the object and send the classified object's image to the operator. Thus if the object is classified as a pet, then the operator can confirm the false alarm without calling someone in the house or a contact person.

The classification method 100 of the present invention is particularly suited to be carried out by a computer software program, such computer software program preferably containing modules corresponding to the individual steps of the method. Such software can of course be embodied in a computer-readable medium, such as an integrated chip or a peripheral device.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for classification of objects in video image data, the method comprising the steps of:

detecting moving objects in the image data;
smoothing the image data to reduce the effects of noise and then applying a derivative operator over the image data:
extracting two or more features from each detected moving object in the image data;
classifying each moving object for each of the two or more features according to a classification method, wherein the classifying comprises using at least two different classification methods for at least two of the two or more features; and
deriving a classification for each moving object based on the classification method for each of the two or more features.

2. The method of claim 1, wherein the detecting step comprises subtracting a background scene from the image data.

3. The method of claim 1, further comprising the step of filtering out unintended moving objects from the detected moving objects.

4. The method of claim 3, wherein the filtering step comprises filtering out unintended moving objects according to a detected speed and aspect ratio of each detected moving object.

5. The method of claim 1, wherein the extracting step comprises extracting at least two of x-gradient, y-gradient, and combined xy-gradient features from each of the detected moving objects.

6. The method of claim 1, wherein the classifying step comprises a Radial Basis Function Network for training and classifying at least one of the detected moving objects.

7. The method of claim 6, wherein the training step comprises:
(a) initializing the Radial Basis Function Network, the initializing step comprising the steps of:
fixing the network structure by selecting a number of basis functions F, where each basis function I has the output of a Gaussian non-linearity;
determining the basis function means $\mu_I$, where I=1, ..., F, using a K-means clustering algorithm;
determining the basis function variances $\sigma_I^2$; and
determining a global proportionality factor H, for the basis function variances by empirical search;
(b) presenting the training, the presenting step comprising the steps of:
inputting training patterns X(p) and their class labels C(p) to the classification method, where the pattern index is p=1, ..., N;
computing the output of the basis function nodes $y_I(p)$, F, resulting from pattern X(p);
computing the F×F correlation matrix R of the basis function outputs; and
computing the F×M output matrix B, where $d_j$ is the desired output and M is the number of output classes and j=1, ..., M; and
(c) determining weights, the determining step comprising the steps of:
inverting the F×F correlation matrix R to get $R^{-1}$; and
solving for the weights in the network.

8. The method of claim 7, wherein the classifying step comprises:
presenting each of the two or more features $X_{test}$ for each detected moving object to the classification method; and
classifying each $X_{test}$ by:
computing the basis function outputs, for all F basis functions;
computing output node activations; and
selecting the output $z_j$ with the largest value and classifying $X_{test}$ as a class j.

9. The method of claim 1, wherein the classifying step comprises outputting a class label identifying a class to which the detected moving object corresponds to and a probability value indicating the probability with which the unknown pattern belongs to the class for each of the two or more features.

10. The method of claim 9, wherein the deriving step comprises averaging the probability values for the two or more features for each detected moving object and determining if the average is greater than a threshold value.

11. The method of claim 9, wherein the deriving step comprises determining if there exists a majority of class labels which identify a like class.

12. An apparatus for classification of objects in video image data, the apparatus comprising:
means for detecting moving objects in the image data;
means for smoothing the image data to reduce the effects of noise;
means for applying a derivative operator over the image data;
means for extracting two or more features from each detected moving object in the image data;
means for classifying each moving object for each of the two or more features according to a classification method, wherein the means for classifying comprises means for using at least two different classification methods for at least two of the two or more features; and
means for deriving a classification for each moving object based on the classification method for each of the two or more features.

13. The apparatus of claim 12, further comprising means for filtering out unintended moving objects from the detected moving objects.

14. The apparatus of claim 12, wherein the means for extracting extracts at least two of x-gradient, y-gradient, and combined xy-gradient features from each of the detected moving objects and the apparatus further comprises means for smoothing the image data to reduce the effects of noise and applying a derivative operator over the image data prior to the extracting.

15. A program storage device readable by machine, tangibly embodying a program of instructions executable by the machine to perform method steps for classification of objects in video image data, the method comprising the steps of:
detecting moving objects in the image data;
smoothing the image data to reduce the effects of noise and then applying a derivative operator over the image data;
extracting two or more features from each detected moving object in the image data;
classifying each moving object for each of the two or more features according to a classification method, wherein classifying comprises using at least two different classification methods for at least two of the two or more features; and
deriving a classification for each moving object based on the classification method for each of the two or more features.

16. A computer program product embodied in a computer-readable medium for classification of objects in video image data, the computer program product comprising:

computer readable program code means for detecting moving objects in the image data;

computer readable program code for smoothing the image data to reduce the effects of noise and then applying a derivative operator over the image data;

computer readable program code means for extracting two or more features from each detected moving object in the image data;

computer readable program code means for classifying each moving object for each of the two or more features according to a classification method, wherein the classifying comprises using at least two different classification methods for at least two of the two or more features; and computer readable program code means for deriving a classification for each moving object based on the classification method for each of the two or more features.

* * * * *